Figure 1:
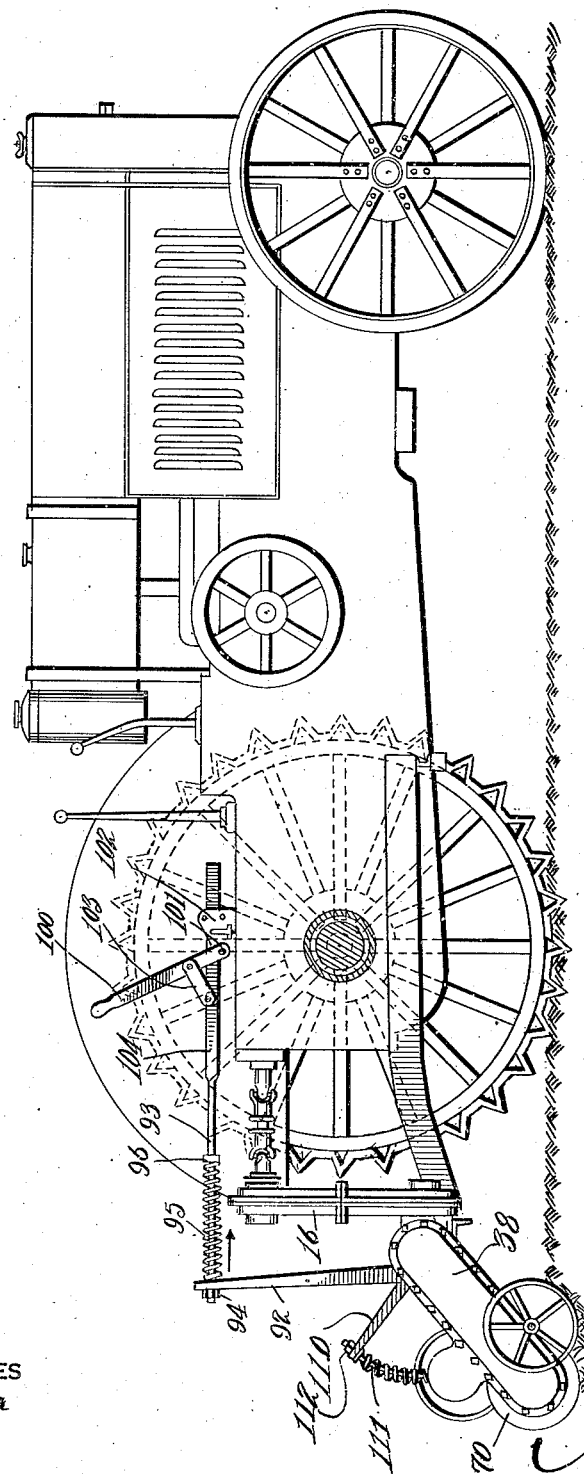

Sept. 23, 1930. J. P. BAGAN 1,776,612
ROTARY CULTIVATOR
Filed Oct. 4, 1928 4 Sheets-Sheet 1

WITNESSES
INVENTOR
J. P. Bagan.
BY
ATTORNEY

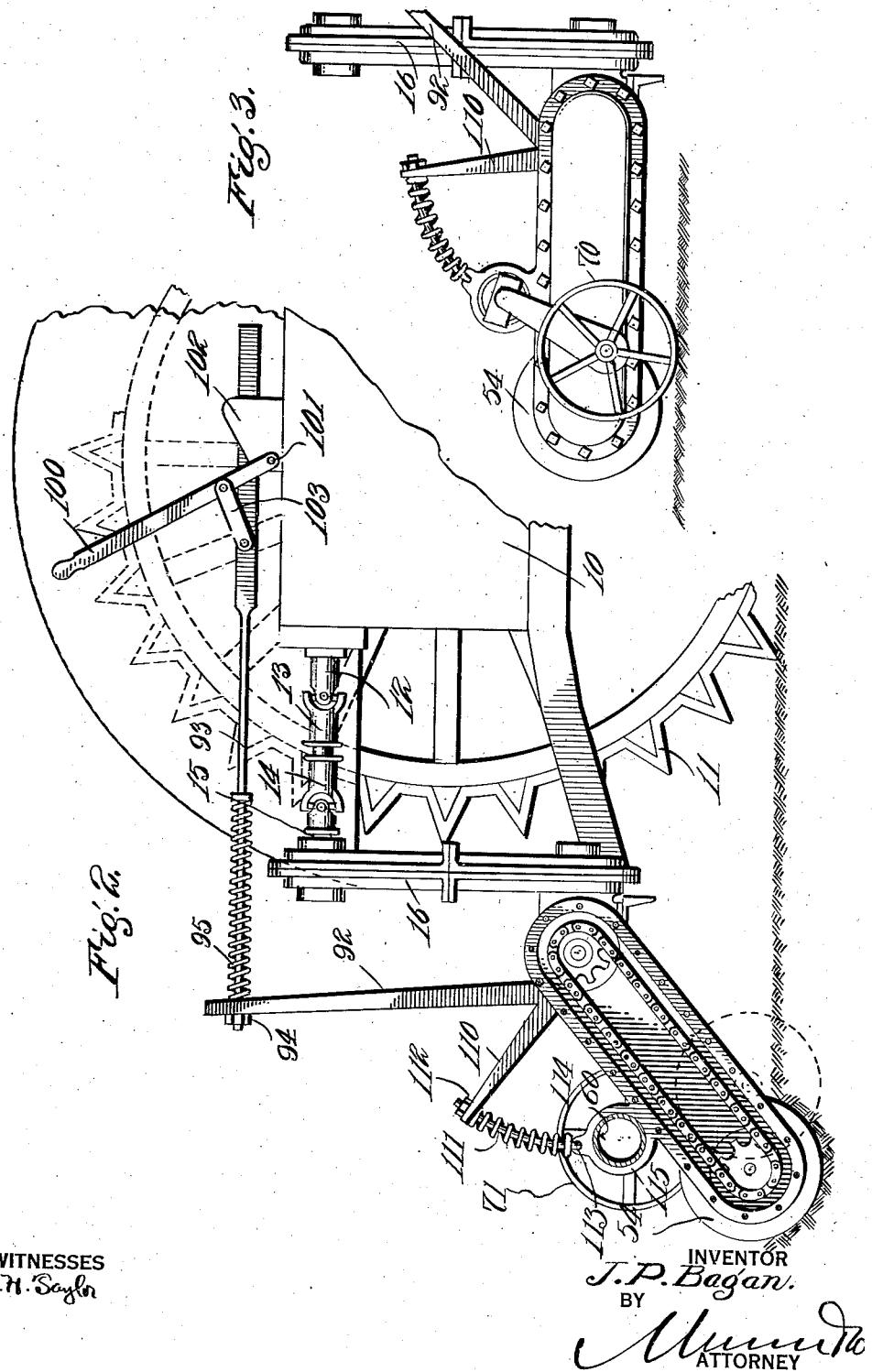

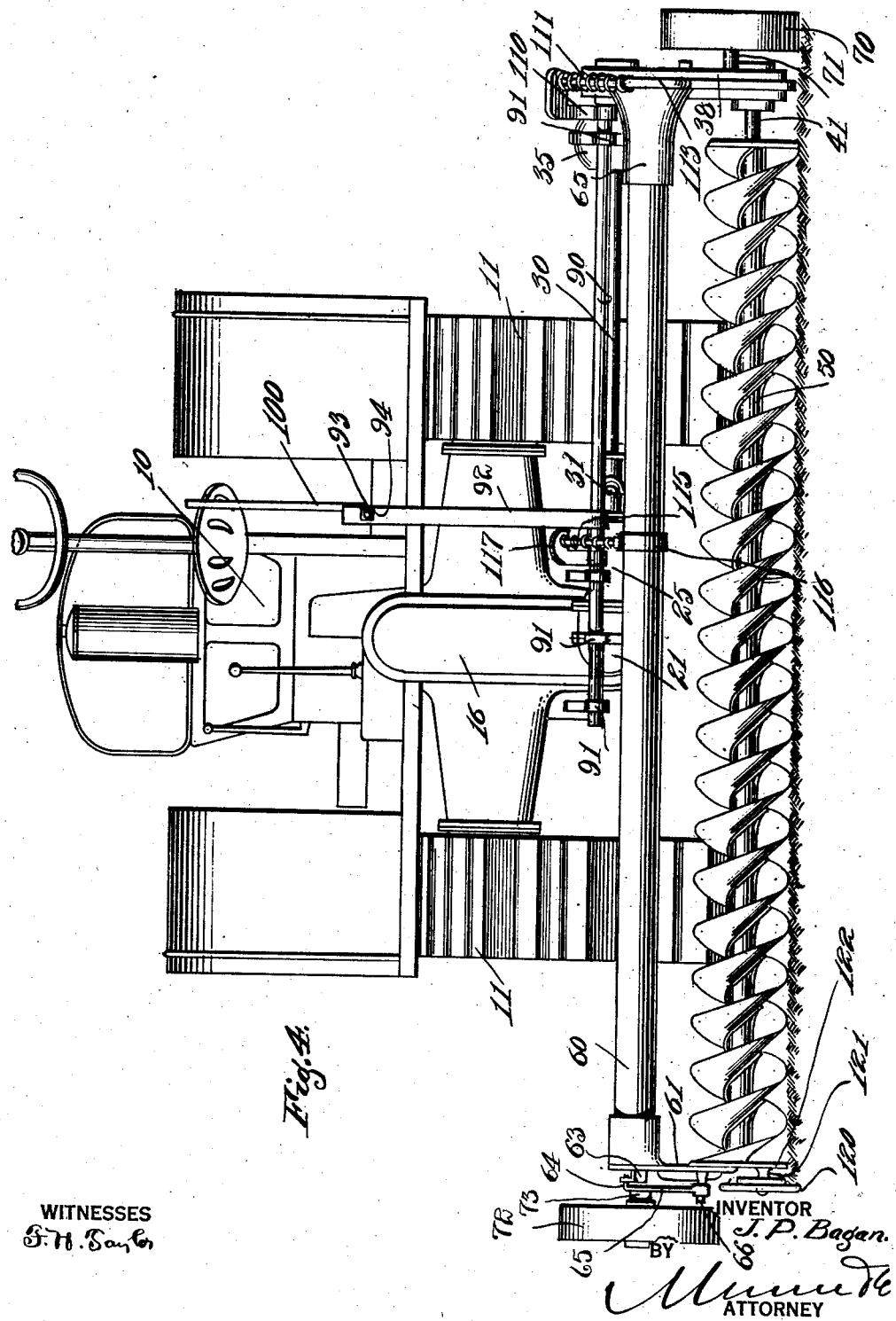

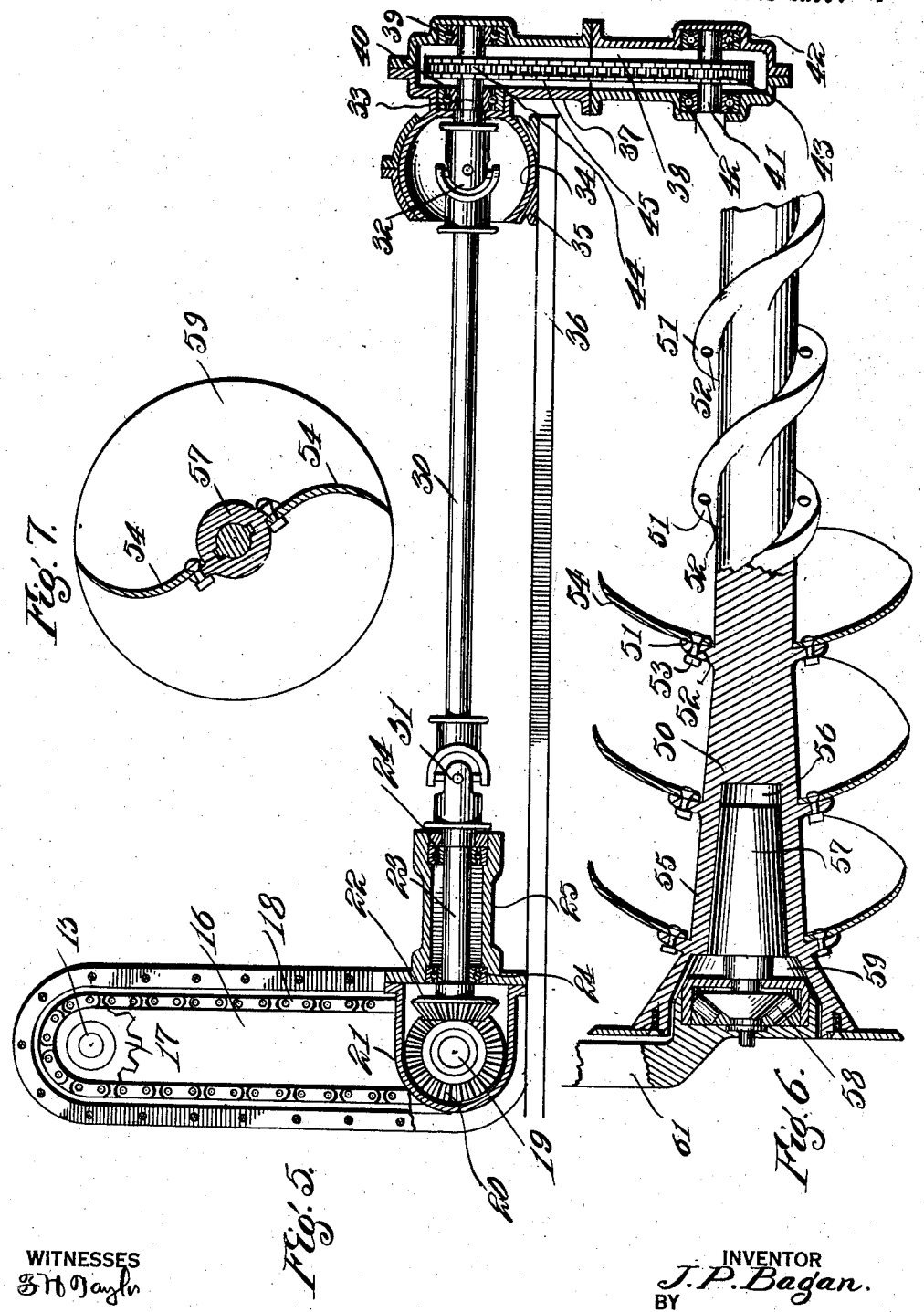

Patented Sept. 23, 1930

1,776,612

UNITED STATES PATENT OFFICE

JOHN P. BAGAN, OF VANCOUVER, BRITISH COLUMBIA, CANADA

ROTARY CULTIVATOR

Application filed October 4, 1928. Serial No. 310,297.

This invention relates to rotary plows.

An object of the invention is the provision of a spirally shaped plow which is movable to or from an operative position by a mechanism supported at the rear of a tractor, wheels being carried by the supporting mechanism of the plow gauging the depth of the cut.

Another object of the invention is the provision of a spirally shaped plow driven from a revolving member of a tractor, certain of the operating parts for the plow forming a pivot around which the plow is moved when raising or lowering said plow to an operative position.

A further object of the invention is the provision of a tractor having a power take-off operatively connected with a rotary plow or cultivator in which a rockable shaft is mounted transversely of the rear end of a tractor and connected by a curved bar to the supporting mechanism of the plow so that when the shaft is rocked, the plow will be raised or lowered.

A still further object of the invention is the provision of a rotary plow having spirally arranged blades removably connected to a shaft, the shaft having spirally formed ribs conforming to the configuration of the blades so that the blades may be secured to the ribs in a removable manner.

Another object of the invention is the provision of a rotary plow driven at the rear end of a tractor by a shaft having operative connection with a power take-off of the tractor, the other end of the shaft being supported by a bracket having a thrust bearing received by a socket or bearing within the shaft, the bracket having a pivotal connection with a rock shaft which controls the position of the plow.

This invention will be best understood from a consideration of the following detailed description, in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a longitudinal side view of the tractor equipped with my rotary cultivator.

Figure 2 is a fragmentary vertical section showing the operative connection between the moving part of the tractor and the rotary cultivator, Figure 3 is a fragmentary side view of the cultivator located in an elevated position, Figure 4 is a rear end view of the tractor showing the rotary cultivator in an operative position, Figure 5 is a vertical section showing operative connection between a moving part of the tractor and the shaft which drives the rotary cultivator, Figure 6 is a fragmentary longitudinal vertical section of the cultivator disposed in the bearings, Figure 7 is a transverse vertical section of the rotary cultivator showing the method of connecting the blades of the spiral cultivator to the shaft.

Referring more particularly to the drawings 10 designates a tractor having wheels 11.

A power take-off shaft 12 projects rearwardly from the tractor and has a pair of shafts 13 and 14 having universal connections, respectively, with the shaft 12 and a shaft 15. Shaft 15 projects into a housing 16 with a sprocket 17 secured to the shaft 15, and a chain 18 is trained over the sprocket 17, and a sprocket (not shown) which is secured to a shaft 19, mounted in bearings in the lower end of the housing 16. Said housing is supported in any approved manner from the rear portion of the tractor.

A gear 20 is mounted in an auxiliary housing 21 connected with the housing 16. Gear 20 is in mesh with a gear 22 rigid with a shaft 23 which is supported in turn by bearings 24 carried at the end of a tube 25.

A shaft 30 has a universal connection 31 at one end with the shaft 23. The other end is connected by means of a universal joint 32 to a shaft 33.

An approximately circular housing 34 is mounted in a bearing 35 carried by a channel iron 36 which is secured to the bottom of the housing 16. The housing 34 is formed integrally with one plate 37 of a housing 38, so that when the last mentioned housing is oscillated the housing 34 will be revolved in the bearing 35. Housing 38 is provided with bearings 39 and 40 in which are mounted the shaft 33. A shaft 41 is mounted in bearings 42 in the lower end of the housing 38. It will be noted that the housing is formed in sections which are bolted together so that the working parts within the housing may be readily removed as desired. By means of the bearing 25 connected with the housing 21, the angle iron 36 and the bearing 35, the shaft 30 is supported from the rear end of the tractor.

A sprocket 43 is rigid with the shaft 41, while a sprocket 44 is rigid with the shaft 33 and located within the housing 38, as is the sprocket 43. A chain 45 is trained around the sprockets 43 and 44.

The shaft 41 forms a reduced portion of a cultivator shaft 50. This shaft extends transversely at the rear end of the tractor and is provided with spirally arranged and integrally formed ribs 51 having perforations 52 in which bolts 53 are inserted for securing the spirally arranged blades 54 to the shaft 50. Said blades form a cultivating implement. It will be seen by this construction that if a portion of a spirally arranged blade were broken, it would be not necessary to discard the entire shaft with the attached cultivating implement, since the blades 54 are made in sections and bolted to the ribs 51, whereby it is possible to remove any portion of the cultivating implement and substitute for said portion a new spiral blade.

The outer end of the shaft 50 is expanded at 55 and provided with a recess 56 to receive a conically shaped axle 57. This axle is supported by means of a thrust bearing 58 mounted in a flared pocket 59 of the shaft 50 and the bearing is carried by means of a bracket or arm 61 secured at its upper end to a rod 60.

A bracket 63 projects from one end of the rod 60 and is provided with a perforation to receive the bent end 64 of a rod on which is pivotally mounted on a pintle 66 carried by the lower end of the bracket arm 61. A gauge wheel 70 is mounted on a stub axle 71 carried by the housing 38, while a gauge wheel 72 is carried by a stub axle 73 secured to the arm 65.

A rock shaft 90 is mounted in bearings 91 carried by the rear end of the tractor. A lever 92 is rigid at one end with the rock shaft 90 and extends upwardly in substantially a vertical position. The upper end of the lever 92 is perforated to receive one end of the rod 93; and a nut 94 on the end of the rod 93 connects the rod with the lever, but permits a slight relative movement between the lever and rod. A coil spring 95 embraces the rod 93 and has one end abutting the lever 92, while the other end abuts a collar 96.

A lever 100 is pivotally mounted at 101 on a bracket 102. A link 103 has pivotal connections between the lever 100 and the flattened portion 104 of the rod 93, so that as the rod is oscillated towards the right in Fig. 1, the lever 92 will be moved in the direction indicated by the arrow. Means (not shown) is provided for maintaining the lever 100 in predetermined position for supporting the rotary plow in an elevated position out of contact with the ground.

A lever 110 is rigid with the rock shaft 90 and is provided with a perforation to receive one end of a curved link 111. A nut 112 maintains the rod in engagement with the lever 110. The other end of the link 111 is connected in any approved manner with a collar 113 secured to one end of the rod 60. The collar in turn is connected in any approved manner with the housing 38.

A rod 115 has one end secured to a collar 116 embracing the rod 60 intermediate the ends thereof. The other end of the curved rod 115 is connected to a lever 117 rigidly attached to the shaft 90.

A wheel 120 mounted on an axle 121 carried by a flange 122 projecting from the member 50, prevents lateral displacement of the plow.

The operation of my device is as follows:

The helically shaped plow is revolved by means of the power take off from the tractor, and at a speed which is conducive to the best results. The plow is lowered after the gauge wheels 70 and 72 have been set so that it will produce the proper depth of cultivation of the soil. It will be noted that the gauge wheel 70 rests upon the bottom of the furrow, while gauge wheel 72 rests upon the ground.

When it is desired to elevate the plow above the ground, as shown more particularly in Fig. 3, the lever 92 is rocked through the lever 100, thereby rocking the shaft 90 and through the levers 110 and 117 the hollow rod 60 is elevated carrying with it the plow 50.

I claim:—

1. In a cultivator, a tractor, a rod, means for mounting the rod for vertical swinging movement at one end of the tractor, a bracket projecting from one end of the rod, a shaft provided at one end with a socket, a bearing carried by the bracket and received by the socket, a rotary cultivating implement rigid with the shaft, means for operatively connecting the other end of the shaft with a moving part of the tractor for causing rotation of the cultivating implement, and means for elevating the rod and likewise the implement.

2. In a cultivator, a tractor, a rod, means for mounting the rod for vertical swinging movement at one end of the tractor, a bracket projecting from one end of the rod, a shaft provided at one end with a socket, a bearing carried by the bracket and received by the socket, a rotary cultivating implement rigid with the shaft, means for operatively connecting the other end of the shaft with a moving part of the tractor for causing rotation of the cultivating implement, and means for elevating the rod and likewise the implement, said rod lying in a horizontal plane, said elevating means including means for supporting a rod in elevated position.

3. In a cultivator, a tractor, a rod, means for mounting the rod for vertical swinging movement at one end of the tractor and including a housing, a bracket projecting from one end of the rod, a shaft provided at one end with a socket, a bearing carried by the bracket and received by the socket, a rotary cultivating implement rigid with the shaft, means for operatively connecting the shaft with a movable part of the tractor for causing rotation of the cultivating implement, means for elevating the rod and likewise the implement, said housing being connected with the other end of the rod and adapted to enclose part of the operative connections between the shaft and the moving part of the tractor.

4. In a cultivator, a tractor, a rod, means for mounting the rod for vertical swinging movement at one end of the tractor and including a housing, a bracket projecting from one end of the rod, a shaft provided at one end with a socket, a bearing carried by the bracket and received by the socket, a rotary cultivating implement rigid with the shaft, means for operatively connecting the shaft with a movable part of the tractor for causing rotation of the cultivating implement, means for elevating the rod and likewise the implement, said housing being connected with the other end of the rod and adapted to enclose part of the operative connections between the shaft and the moving part of the tractor, and gauge wheels supported by the bracket and the housing.

5. In a cultivator, a tractor, a rod, means for mounting the rod for vertical swinging movement at one end of the tractor and including a housing, a bracket projecting from one end of the rod, a shaft supported by the bracket and housing, a rotary cultivating implement rigid with the shaft, a second shaft mounted for rotation adjacent one end of the tractor, means operatively connecting the last-mentioned shaft with a moving part of the tractor, a sprocket on the end of each shaft, a chain trained around the sprocket, said housing embracing the sprocket and chain, and means for supporting a rod in various horizontal positions from the tractor.

6. In a cultivator, a tractor, a rod, means for swingably supporting the rod from the rear of the tractor and including a housing rigid with one end of the rod, a bracket projecting from the other end of the rod, said bracket being provided with a bearing, a driven shaft having a sprocket at one end receiving the bearing, the other end of the shaft being journaled in one end of the housing, a second driven shaft supported from the tractor and having operative connections with a moving part of the tractor, the other end of the housing being journaled on the second driven shaft, operative connections between the shafts and located within the housing for causing rotation of the first-mentioned shaft, and a cultivating implement connected to the first shaft.

7. In a cultivator, a tractor, a rod, means for swingably supporting the rod from the rear of the tractor, and including a housing rigid with one end of the rod, a bracket projecting from the other end of the rod, said bracket being provided with a bearing, a driven shaft having a socket at one end receiving the bearing, the other end of the shaft being journaled in one end of the housing, a second driven shaft supported from the tractor and having operative connections with a moving part of the tractor, the other end of the housing being journalled on the second-mentioned shaft, operative connections between the shafts and located within the housing for causing rotation of the first-mentioned shaft, a cultivating implement connected to the first shaft, and a gauge wheel carried by the bracket.

JOHN P. BAGAN.